United States Patent [19]

Boozer

[11] 3,926,901

[45] Dec. 16, 1975

[54] PREPARATION OF SULFUR VULCANIZABLE OIL EXTENDED ELASTOMERIC MATERIAL AND VULCANIZATES THEREFROM

[75] Inventor: Charles E. Boozer, Baton Rouge, La.

[73] Assignee: Copolymer Rubber & Chemical Corporation, Baton Rouge, La.

[22] Filed: Sept. 17, 1973

[21] Appl. No.: 398,092

Related U.S. Application Data

[60] Division of Ser. No. 278,350, Aug. 7, 1972, abandoned, which is a continuation of Ser. No. 64,141, Aug. 3, 1970, abandoned, which is a continuation of Ser. No. 847,505, July 16, 1969, abandoned.

[52] U.S. Cl. .................... 260/33.6 AQ; 260/94.3
[51] Int. Cl.² ........................................... C08K 5/01
[58] Field of Search ............................ 260/33.6 AQ

[56] References Cited
UNITED STATES PATENTS

| | | | |
|---|---|---|---|
| 2,999,822 | 9/1961 | Pfau et al. | 260/2.5 |
| 3,000,866 | 9/1961 | Tarney | 260/33.6 AQ |
| 3,074,902 | 1/1963 | Pfau et al. | 260/33.6 AQ |
| 3,196,126 | 7/1965 | Wald | 260/33.6 AQ |
| 3,646,169 | 2/1972 | Wirth | 260/33.6 AQ |

OTHER PUBLICATIONS

Nordel, DuPont, Inc., Apr. 1964, pp. 3, 4, 23, 24.

*Primary Examiner*—Melvyn I. Marquis
*Assistant Examiner*—H. H. Fletcher
*Attorney, Agent, or Firm*—McDougall, Hersh & Scott

[57] ABSTRACT

High Mooney, sulfur vulcanizable synthetic elastomers prepared by interpolymerizing a monomeric mixture containing ethylene, an alpha monoolefin having 3–16 carbon atoms and a 5-alkylidene-2-norbornene having from 2–8 carbon atoms in the alkylidene group are oil extended by an improved method wherein the degree of unsaturation of the elastomer (greater than 3 carbon-to-carbon double bonds per 1,000 carbon atoms) and the amount of added oil are correlated to produce a relatively low Mooney, oil extended elastomer from which high quality vulcanizates may be prepared. A method is also provided for preparing high quality vulcanizates from the oil extended elastomeric material of the invention.

4 Claims, No Drawings

PREPARATION OF SULFUR VULCANIZABLE OIL EXTENDED ELASTOMERIC MATERIAL AND VULCANIZATES THEREFROM

This is a division of my copending application Ser. No. 278,350, filed Aug. 7, 1972, entitled "Preparation of Sulfur Vulcanizable Oil Extended Elastomeric Material and Vulcanizates Therefrom," which is a continuation of application Ser. No. 64,141, filed Aug. 3, 1970, which was a continuation of application Ser. No. 847,505, filed July 16, 1969 all of which are now abandoned.

This invention broadly relates to a novel method of preparing an oil extended sulfur vulcanizable synthetic elastomeric material. The invention further relates to a method of preparing improved vulcanizates from the oil extended elastomeric material of the invention.

It is known that elastomers may be prepared by interpolymerizing a monomeric mixture composed of ethylene and at least one higher straight chain alpha monoolefin in solution in an organic solvent and in the presence of a Ziegler polymerization catalyst. However, the resulting elastomers are not sulfur vulcanizable as they contain no ethylenic unsaturation. Substances other than sulfur must be used for curing purposes, such as the organic peroxides.

Efforts have been made heretofore to provide ethylenic unsaturation in the above mentioned class of elastomers by including a reactive monomeric polyene in the mixture of straight chain alpha monoolefins to be polymerized. The resulting interpolymer contains residual ethylenic unsaturation, and it may be readily cured with sulfur following prior art practices.

In the interest of simplifying the discussion, the sulfur curable elastomers prepared by interpolymerizing a monomeric mixture containing ethylene, at least one higher alpha monoolefin containing 3–16 and preferably 3–10 carbon atoms, and at least one compound having a plurality of carbon-to-carbon bonds may be referred to herein as ethylene-propylene-diene methylene (EPDM) rubbers, such as defined in ASTM D 1418–65, as this represents the presently preferred monomeric mixture. However, when this term is used, it is understood that interpolymerizable straight chain monoolefins containing 4–16 carbon atoms may be substituted for at least part of the propylene, and that interpolymerizable compounds in general having a plurality of carbon-to-carbon double bonds may be substituted for all or part of the diene monomer.

There is a substantial economic advantage in producing tough high Mooney elastomers and plasticizing them with extender oils to a workable lower Mooney plasticity. In effect, low cost petroleum derived extender oils replace the higher cost synthetic elastomers as a greater weight of usable product is produced. The resulting oil extended elastomeric material is much lower in cost, and yet satisfactory vulcanizates may be prepared therefrom without difficulty in instances where diene rubbers such as styrene-butadiene rubber, cis-1,4-polybutadiene and synthetic cis-1,4-polyisoprene are used. Most of the physical properties of vulcanizates prepared from oil extended diene rubbers are not affected greatly, and accelerators may be used to increase the rate of cure. However, accelerators do not increase the rate of cure substantially and the physical properties usually are much lower when preparing vulcanizates from oil extended EPDM rubbers. As a result, the art has long sought an entirely satisfactory process for oil extending EPDM elastomers whereby high quality vulcanizates having predictable physical properties may be produced.

It is an object of the present invention to provide a novel method of preparing oil extended, sulfur vulcanizable synthetic materials.

It is a further object to provide improved oil extended EPDM elastomers for use in the preparation of high quality vulcanizates.

It is still a further object to provide a novel method of preparing improved vulcanizates from the above mentioned oil extended elastomeric materials of the invention.

Still other objects and advantages of the invention will be apparent to those skilled in the art upon reference to the following detailed description and the examples.

In accordance with one important variant of the invention, high Mooney sulfur vulcanizable EPDM elastomers are oil extended by an improved method wherein the degree of unsaturation of the elastomer and the amount of added oil are correlated to produce an oil extended elastomeric composition which has a desired lower Mooney plasticity, and which also is capable of producing high quality vulcanizates when used in prior art recipes for preparing vulcanizates therefrom. In accordance with still another important variant of the invention, a method is provided for preparing high quality vulcanizates from the oil extended elastomeric material of the invention. It will be appreciated by those skilled in the art that there are preferred variants of the above methods which produce unusually good results and such variants will be discussed in greater detail hereinafter.

Prior art reaction conditions useful for preparing high Mooney polymers may be used when preparing the EPDM elastomer or mixtures thereof to be oil extended in accordance with the invention. Examples of patents which disclose satisfactory procedures for preparing EPDM elastomers from monomeric mixtures of alpha monoolefins and polyenes include U.S. Pat. Nos. 2,933,480, 3,093,620, 3,093,621 and 3,211,709, the disclosures of which are incorporated herein by reference. The polymerization procedures disclosed therein produce a solution of the EPDM elastomer in the organic polymerization solvent and the solid elastomer may be recovered therefrom by flashing off the solvent in accordance with prior art procedures.

The oil that is added to the EPDM elastomer may be a commercially available extender or processing oil, including naphthenic, highly naphthenic, aromatic, highly aromatic and paraffinic extender and processing oils. Such oils are usually derived from petroleum and, in general, include petroleum-based rubbery polymer extender oils or processing oils, which are added to ethylene-propylene-diene monomer rubbers, styrene-butadiene rubbers, etc. The extender oils meeting ASTM specification number D-2226, types 101, 102 and 103 also may be used and the highly naphthenic petroleum-based oils are preferred in many instances. The foregoing oils may be referred to collectively in the specification and claims as being extender oils.

The extender oil may be added to the EPDM elastomer by any convenient method. For instance, the extender oil may be heated until it is fluid and relatively nonviscous, and then added to a solution of the elastomer still in the original polymerization solvent with vigorous agitation. The solution of elastomer also may be heated to an elevated temperature to aid in dissolving the oil therein. Since the extender oils of commerce are usually viscous in nature, if desired, the oil may be first dissolved in dry fresh polymerization solvent so as to form a nonviscous solution, and then the solution of extender oil is added to a solution of elastomer with vigorous agitation to assure thorough mixing. The extender oil may also be blended with solid EPDM elastomer which has been recovered from the polymerization solvent by flashing, but usually this procedure is not preferred.

The amount of extender oil to be added may vary over wide ranges, but it is understood that in each instance the amount is correlated with the degree of unsaturation of the elastomer to thereby arrive at an oil extended elastomeric material in accordance with the invention. The raw Mooney plasticity of the initial EPDM elastomer may be 80–250 or even higher in some instances. (The Mooney values given herein are $ML_8$ at 250° F. unless specifically stated to the contrary.) As is understood by those skilled in this art, the high Mooney elastomer is extended with sufficient oil to reduce the Mooney plasticity to a workable range which is suitable for the specific product to be manufactured. For tires and many mechanical goods, a Mooney value of 60–80 and for better results about 70, is preferred. For softer rubber goods, Mooney values of 40–50 are satisfactory. In order to arrive at the lower Mooney values, oil is added as necessary in quantities of about 25–400 parts by weight for each 100 parts by weight of EPDM elastomer (phr). By way of specific examples, when the starting Mooney value is 200, then about 75–80 phr of extender oil may be added to provide a raw Mooney value of about 70 for the extended elastomer, and about 95–100 phr of extender oil may be added to provide a Mooney value of about 40. In instances where the initial Mooney value is 150–160, then about 50 phr of extender oil may be added to provide a Mooney value of about 70 for the oil extended product.

Regardless of the amount of extender oil which is added, it is understood that the unsaturation level of the unextended EPDM elastomer is selected so as to provide a desired unsaturation level in the resulting oil extended elastomer which is based upon the total weight of the elastomer and oil. This desired unsaturation level for the oil extended product is normally the same as that unsaturation level which produces desirable results in the unextended EPDM elastomer. By way of example, when preparing tire treads and mechanical rubber goods, the preferred unsaturation level in the unextended EPDM elastomer is often about 2–5 carbon-to-carbon double bonds per 1,000 carbon atoms in the polymer (C=C/1,000 C), and for best results about 2.5–3.0 C=C/1000 C. Since these unsaturation levels are for the unextended EPDM elastomer, a substantially higher unsaturation level must be present in the EPDM elastomer to be extended so as to arrive at an equivalent unsaturation level in the oil extended elastomer, when based upon the total weight of oil and elastomer. For instance, if the unsaturation level in an unextended elastomer should be 2.5 C=C/1000 C in a given recipe, and if an EPDM elastomer is produced having an initial raw Mooney value of 150–160 and 50 phr of extender oil is added to reduce the Mooney value to about 70, then the unsaturation level of the unextended EPDM elastomer should be about 3.75 C=C/1,000 C. This results in an average unsaturation level in the combined weight of oil and polymer of 2.5 C=C/1,000 C.

The unsaturation level to be selected for the oil extended elastomer in a given instance will depend upon the specific compounding recipe and end use. Usually this unsaturation level will vary between 2 and 25 C=C/1000 C. As was pointed out above, tires and many mechanical goods require an unsaturation level of about 2–5, and preferably 2.5–3.0 C=C/1000 C. However, when the oil extended EPDM elastomer is to be blended with a highly unsaturated diene rubber such as styrene-butadiene rubber, cis 1,4-polybutadiene, synthetic cis 1,4-polyisoprene and natural rubber to improve the ozone aging or oxidation resistance, then higher unsaturation levels produce better results. In preparing the blends, usually the unsaturation level of the oil extended EPDM elastomer should be about 5–25 C=C/1000 C and preferably about 5–15 C=C/1000 C based on the total weight of oil and EPDM elastomer.

When the amount of the extender oil that is added to the high Mooney EPDM elastomer and the initial unsaturation level of the elastomer are correlated so as to provide in each unit weight of oil extended elastomeric material the same unsaturation level which would normally be present in a suitable unextended elastomer, surprisingly the vulcanizates produced therefrom have good physical properties. Additionally, there is substantially less heat buildup in the vulcanizates and this is of importance in instances where the extended product is used in the manufacture of pneumatic tires. Fast cure rates are also achieved, and this is important for high production rates of vulcanizates.

When preparing the oil extended EPDM elastomers of the invention on a commercial scale, preferably the extender oil is added to a solution of the elastomer in the polymerization solvent in the quantities discussed above. The resulting solution of elastomer and oil may be passed to a prior art process for removing the solvent and recovering the oil extended solid elastomer in a desired form such as crumb. For instance, the oil extended elastomer may be recovered by introducing the solution below the surface of a body of hot water maintained in a coagulation tank to which steam is supplied continuously. The solvent is evaporated and recovered overhead, and the oil extended elastomer is recovered in the form of crumb. The crumb may be withdrawn, stripped with steam in a second vessel to remove traces of solvent, washed with water to remove impurities, dewatered, dried by means of a prior art extrusion drier or an apron drier, and baled.

If desired, it is also possible to prepare oil-carbon black masterbatches in a manner similar to that discussed above for oil masterbatches. The above general procedure is followed and ground carbon black in the form of a slurry in water or the polymerization solvent for the EPDM elastomer, is admixed with the solution of elastomer either before or after the addition of the extender oil. The resulting mixture contains a solution of oil and elastomer, and carbon black is suspended therein. The oil-carbon black masterbatch is recovered in the form of solid crumb in a manner analogous to the method discussed above for the oil masterbatch. The amount of carbon black to be added may vary over wide ranges, such as 50–200 phr, and preferably about 80 phr.

The grades of carbon black which may be used as reinforcing agents are discussed by W. R. Smith in *Encyclopedia of Chemical Technology*, Vol. 3, pps. 34–65, and in the text, Synthetic Rubber, by Whitby, Editor-in-Chief, John Wiley and Sons, Incorporated, New York, N.Y. (1954), the teachings of which are incorporated herein by reference. Examples of specific rubber grade carbon blacks include easy, medium, and hard-processing channel, semi-reinforcing furnace, high modular furnace, medium-abrasion furnace, fast extrusion furnace, fine furnace, very fine furnace, reinforcing furnace, high abrasion furnace, conductive channel, conductive furnace, medium thermal, super abrasion furnace, intermediate super abrasion furnace, and fine thermal carbon blacks. These carbon blacks may be referred to herein as being rubber grade carbon black reinforcing agents. The carbon black may be used in the commercially available form without further treatment other than grinding to a finely divided state if desired.

The oil extended elastomeric materials of the invention may be cured with sulfur following prior art procedures and special curing techniques are not necessary. Also, the standard recipes and compounding techniques which are normally employed with unextended EPDM elastomers are used as a general rule. Various curing procedures, including the materials and the quantities thereof to be employed, are described in a large number of publications which are well known in the art. The publications include *Principles of High Polymer Theory and Practice*, Schmidt, et al, McGraw-Hill Book Company, New York (1948); *Chemistry and Technology of Rubber*, Davis, et al., Reinhold Publishing Corporation, New York (1937); *The Applied Science of Rubber*, edited by W. J. S. Naunton, published by Edward Arnold, Limited, London (1961), and the *Encyclopedia of Chemical Technology*, Kirk and Othmer, published by Interscience Encyclopedia, Incorporated, New York (1953).

Oil extended EPDM elastomers may be vulcanized with vulcanizing agents including sulfur or sulfur bearing compounds which provide sulfur under the vulcanizing conditions, in accordance with the general procedures taught by the above mentioned texts. Sulfur is the preferred vulcanizing agent, and it is usually used in an amount of about 0.5–5 and preferably about 1–2 parts by weight per 100 parts by weight of the oil extended EPDM elastomer. Zinc oxide and other metal oxides may be used in an amount of about 2–10 phr. Vulcanization accelerators such as tetramethylthiuram monosulfide, tetramethylthiuram disulfide, the zinc salt of dimethyldithiocarbamic acid, the piperidine salt of pentamethylene dithiocarbamic acid, N,N-diethylthiocarbamyl-2-mercaptobenzothiazole and 2-mercaptothiazoline may be used.

Vulcanization is accomplished by heating the compounded ingredients described above at a vulcanizing temperature and for a period of time sufficient for the vulcanization reaction to occur. A temperature of about 130°–190° C. for about 10–90 minutes and preferably about 160° C. for about 30 minutes, is often satisfactory. The specific time and temperature that are selected in a given instance will depend upon the nature of the specific vulcanizing agent, accelerator and other ingredients which are present.

The oil extended EPDM elastomers of the present invention are also useful in blending with diene rubbers such as SBR, nitrile rubber, cis-1,4-polybutadiene, natural rubber and synthetic cis-1,4-polyisoprene. The blends may contain about 5–95 parts by weight of the oil extended EPDM elastomer for each 95–5 parts by weight of the highly unsaturated diene rubber, but better results are obtained in many instances when the blends contain about 15–30 parts by weight of the oil extended EPDM elastomer for each 85–70 parts by weight of the diene rubber. Such blends are aging and ozone resistant, and also cocure when sulfur is used as a curing agent.

The EPDM elaastomer to be used in practicing the present invention is an interpolymer of ethylene, one or more higher monoolefins having 3–16 and preferably 3–10 carbon atoms, and a 5-alkylidene-2-norbornene having from 2–8 carbon atoms in the alkylidene group, and preferably 5-ethylidene-2-norbornene, in which the alkylidene norbornene is preferably present in an amount to provide for a degree of unsaturation of at least 3 carbon-to-carbon double bonds per 1,000 carbon atoms in the elastomer.

The polymerization solvent may be any suitable inert or saturated hydrocarbon which is liquid and relatively nonviscuous under the reaction conditions, including the prior art solvents for the solution polymerization of monoolefins in the presence of Ziegler catalysts. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene, toluene, etc.; and saturated cyclic hydrocarbons which have boiling ranges approximating those for the open chain and aromatic hydrocarbons discussed above, and especially saturated cyclic hydrocarbons containing 5 ot 6 carbon atoms in the ring. The solvent may be a mixture of one or more of the foregoing hydrocarbons, such as a mixture of aliphatic and naphthenic hydrocarbon isomers having approximately the same boiling range as normal hexane. The solvent should be dry and free of substances which will interfere with the Ziegler catalyst to be used in the polymerization step.

Catalysts in accordance with the prior art may be used in preparing the solution of polymer to be treated in accordance with the invention. In general, prior art Ziegler-type catalysts may be used which are known to produce a satisfactory elastomer. Examples of such catalysts are disclosed in a large number of issued patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a metal of groups IV$a$, V$a$, VI$a$ and VII$a$ of the Mendelejeff periodic chart of the elements, as typified by titanium, vanadium and chromium halides, with an organometallic compound of a metal of groups I, II or III of the Mendelejeff periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkylaluminum halide. Examples of suitable vanadium compounds include vanadium trichloride, vanadium tetrachloride, vanadium oxychloride, vanadium acetylacetonate, etc. Activators which are especially preferred include the alkylaluminum chlorides of the general formulae $R_1AlCl_2$ and $R_2AlCl$, and the corresponding sesquichlorides of the general formula $R_3Al_2Cl_3$, where R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually one mole of vanadium oxychloride for each 4–10 moles of the alkylaluminum sesquichloride.

The foregoing detailed description and the following specific examples are for purposes of illustration only, and are not intended as being limiting to the spirit or scope of the appended claims.

EXAMPLE I

The following example illustrates the preparation of a high Mooney terpolymer with medium high unsaturation which is suitable for oil extension.

The reaction vessel is a one-half gallon Sutherland reactor equipped with a high speed, heavy-duty, air driven motor, cooling coils, a thermometer, a temperature regulator, a pressure regulator, an injection port, and other openings where monomers, catalyst, and solvent are fed to the reactor. A tube dipping to the bottom of the reactor is present for the removal of the cement which is produced on a continuous basis. A vapor phase vent is provided to bleed off 15 percent of the gaseous monomer feed to prevent inert gas buildup.

The clean reactor is assembled, rinsed with dry hexane and purged with dry nitrogen. The reactor bowl is heated with a flameless blowtorch and hot water is run through the coils until the temperature in the reactor is about 70° C. After this, propylene is flushed through the reactor for about 15 minutes. The temperature is lowered to ambient and 1 liter of Esso chemical grade hexane, which has been dried over 4A molecular sieves and stored over sodium, is added to the reactor. As the temperature is raised to 30° C., propylene is fed to the reactor through a 4A molecular sieve column until 42.2 inches of mercury pressure is reached. The pressure is then raised to 61 inches of mercury with ethylene fed through a 4A molecular sieve column and 4.4 millimoles (0.61 cc) of pure 5-ethylidene-2-norbornene and 1.3 cc of 1.5 M ethylaluminum sesquichloride are added.

The monomer feeds are stopped and the catalyst components, i.e., a 0.525 molar solution of ethylaluminum sesquichloride and a 0.0543 molar solution of vanadium oxytrichloride, at a 12 to 1 aluminum to vanadium ratio are fed into the reactor at a constant rate until a drop in the pressure is noted. At this time, the gaseous monomers are fed into the reactor through calibrated rotometers at a rate of 1542 cc/minute, of which 696 cc are ethylene and 846 cc are propylene. The 5-ethylidene-2-norbornene is added as a 0.30 molar solution in hexane, which is also 0.009 molar in pyridine, at a rate of 1.30 cc/minute to provide about 3.2 weight percent to be incorporated into the polymer. The polymerization is controlled by the catalyst pumps which add catalyst on demand as the pressure increases, thus maintaining the 61 inches of mercury pressure throughout the run. When the solution in the reactor contains 6 percent polymer, fresh solvent containing 16 cc of ethylene per cc of solvent is fed into the reactor at the rate of 26.5 cc/minute and the polymer cement is taken off continuously. About 90.4 grams of polymer per hour is produced.

At this time, the ethylene and propylene feeds are adjusted to 345 cc/minute and 1,843 cc/minute, respectively, to compensate for the unreacted monomers removed with the cement. The feed rate of the solution of 5-ethylidene-2-norbornene is adjusted to 2.7 cc/minute.

The solution cement as removed from the reactor is fed into a Waring Blender containing water where it is intimately mixed. The cement is then washed three times with equal volumes of water. The washed cement is stabilized with one part by weight based on 100 parts by weight of rubber of a stabilizer (SDAO, a product of Naugatuck Chemical Company) and is fed under nitrogen pressure into a T-joint at the bottom of a 4-liter container filled with hot circulating water. The other end of the "T" is connected to a steam line and steam is admitted at a rate to superheat the rubber cement. The solvent and unreacted monomers are mostly removed by this procedure, and the rubber crumb is collected on a screen, washed, chopped up in a Waring Blender, and dried in an oven at 90° C. The rubbery copolymer contains ethylene and propylene in a ratio of 60 moles of chemically bound ethylene to 40 moles of chemically bound propylene as determined by infrared analysis, using the 720 cm$^{-1}$ absorbance for ethylene and the 968 cm$^{-1}$ absorbance for propylene. The raw Mooney value of this polymer is about 157 (ML$_8$ at 250° F.).

Based upon the chemically bound 5-ethylidene-2-norbornene content of the polymer, the calculated or theoretical unsaturation level expressed as carbon-to-carbon double bonds per 1,000 carbon atoms is 3.7.

By suitable adjustment of the polymerization temperature and the diene feed rate, it is possible to prepare terpolymers with various Mooney values and unsaturation values as are needed for high quality oil extended rubbers. The terpolymers used in the following examples were prepared by the modifications of the above example. Wherever the temperature is decreased it is necessary to feed more of the ethylene and propylene monomers to allow for the greater loss of these monomers in the product stream due to their increased solubility at lower temperatures. These lower temperatures are needed to produce high Mooney terpolymers. About 5–10 Mooney points per degree centigrade is the usual variation obtained.

EXAMPLE II

A terpolymer of ethylene, propylene and 5-ethylidene-2-norbornene was used in this example. The terpolymer had a molar ratio of chemically bound ethylene to propylene of 59.6:40.4, as determined by infrared analysis. The 5-ethylidene-2-norbornene was chemically bound in the terpolymer in an amount to provide 3.75 C=C/1000 C in the polymer, as determined by infrared analysis.

The terpolymer had a raw Mooney value of 157 (ML$_8$ at 250° F.). Each 100 parts by weight of the terpolymer was blended with 50 parts by weight of highly naphthenic nonstaining extending oil. The raw Mooney plasticity value of the oil extended terpolymer was 67 (ML$_8$ at 250° F.). The unsaturation level of the oil extended blend was 2.5 C=C/1000 C, based on the number of carbon-to-carbon double bonds per 1,000 carbon atoms in the terpolymer and the total number of carbon atoms in the naphthenic extending oil and the terpolymer.

The above prepared oil extended terpolymer was compounded in a Brabender plasticorder following prior art practices, as follows:

| Ingredient | Parts by Weight |
| --- | --- |
| Oil extended terpolymer | 100 |
| ISAF carbon black | 80 |
| Naphthenic oil (Processing oil) | 55 |
| Zinc Oxide | 5 |
| Stearic Acid | 1 |
| Mercaptobenzothiazole | 0.75 |
| Tetramethylthiuram monosulfide | 1.50 |
| Sulfur | 1.50 |

The above compounded recipe had a Mooney of 50 $ML_4$ at 212° F. The Garvey die rating was A–10. The portions of the compounded terpolymer were vulcanized at 320° F. for times varying between 15 minutes and 40 minutes, and the resulting vulcanizates tested to determine the tensile strength, elongation and modulus. The following data were obtained:

| Cure Time Minutes | Tensile Strength psig | Elongation % | Modulus at 300% |
| --- | --- | --- | --- |
| 15 | — | — | 975 |
| 25 | 2450 | 520 | 1150 |
| 40 | — | — | 1275 |

The cure rate value was 3.49.

Additional tests were made on the specimen cured for 25 minutes, as follows: The Shore "A" hardness was 60, the Goodrich Flexometer value was 57 ($\Delta T$, °F.), the compression set was 19.6 percent at 70° C. and 51.3 percent at 100° C., the retention of tensile strength upon oven aging was 97 percent and the retention of elongation upon aging was 58 percent.

In this and the following examples, the hardness was determined on a Shore "A" Durometer, the heat rise ($\Delta T$, °F.) was determined by the Goodrich method, the slope of the cure-curve was determined on a Monsanto Rheometer, and the cured properties are determined by standard ASTM methods F 412-62-T, D 1646-63 and D 395-61-B.

EXAMPLE III

The general procedure of Example II was followed with the exception of employing an ethylene-propylene-5-ethylidene-2-norbornene terpolymer having a raw Mooney value of about 150, and an unsaturation level of 7.0 carbon-to-carbon double bonds per 1,000 carbon atoms initially.

After adding 50 parts by weight per 100 parts by weight of terpolymer of the extending oil, the Mooney plasticity was about 65 ($ML_8$ at 250° F.), and the unsaturation level based upon the polymer and oil was 4.7 carbon-to-carbon double bonds in the terpolymer per 1,000 carbon atoms in the terpolymer and oil.

The Mooney value of the compounded polymer was 42 ($ML_4$ at 212°F.). The cure rate was 5.6.

The compounded terpolymer was cured and tested following the same procedure as used in Example II. The tensile strength (psi), percent elongation and modulus at 300 percent were 2075, 420 and 1375, respectively, for a cure time of 15 minutes, and 2100, 400 and 1575, respectively, for a cure time of 25 minutes. The Shore "A" hardness values were 55 and 57 for specimens cured at 15 minutes and 25 minutes, respectively. The specimen cured for 25 minutes had a Goodrich Flexometer value of 60 ($\Delta T$, °F.), and the compression set after 22 hours at 70° C was 13.

EXAMPLE IV

The low Mooney ethylene-propylene-5-ethylidene-2-norbornene terpolymer used in this example had a Mooney plasticity value of about 65 ($ML_8$ at 250° F.). It was not oil extended. The terpolymer contained sufficient chemically bound 5-ethylidene-2-norbornene to provide an unsaturation level of 7.0 carbon-to-carbon double bonds per 1,000 carbon atoms in the polymer.

The above terpolymer, without oil extension, was compounded, cured and tested in accordance with Example II. The compounded terpolymer had a Mooney value of 59 ($ML_4$ at 212° F.). The cure rate was 7.9.

The tensile strength (psig). percent elongation and modulus at 300 percent elongation were 2,525, 430, and 1,600, respectively, for the specimen cured for 15 minutes and 2,500, 400 and 1,750 for the specimen cured at 25 minutes. The specimen cured for 15 minutes had a Shore "A" hardness value of 63, and the specimen cured for 25 minutes had a Shore "A" hardness value of 66. The specimen cured for 25 minutes had a Goodrich Flexometer value of 68 ($\Delta T$, °F.), and the compression set after 22 hours at 70° C. was 13.8.

EXAMPLE V

The ethylene-propylene-5-ethylidene-2-norbornene terpolymer used in this example had a raw Mooney value of about 150 ($ML_8$ at 250° F.), and contained sufficient chemically bound 5-ethylidene-2-norbornene to provide an unsaturation level initially of 10.5 carbon-to-carbon double bonds per 1,000 carbon atoms.

After extending with 50 parts by weight of oil per 100 parts by weight of terpolymer, the Mooney plasticity value was about 67 ($ML_8$ at 250° F.), and the unsaturation level of the oil extended terpolymer was 7.0 carbon-to-carbon double bonds in the terpolymer per 1,000 carbon atoms in the polymer and extending oil.

The oil extended terpolymer was then compounded, cured and tested following the general procedure of Example II. The Mooney value of the compounded polymer was 32. The cure rate was 5.6.

The tensile strength (psig), percent elongation, and modulus at 300 percent elongation were 2,200, 400 and 1,475, respectively, for the specimen cured for 15 minutes, and 2,100, 360 and 1,650, respectively, for the specimen cured for 25 minutes. The Goodrich Flexometer value was 73 ($\Delta T$, °F.) for the specimen cured for 25 minutes. The Shore A-hardness value was 64 for the specimen cured for 15 minutes, and 66 for the specimen cured for 25 minutes.

EXAMPLE VI

This example illustrates the preparation of an oil masterbatch from the solution of terpolymer prepared in Example I.

Extender oil in an amount of 50 parts by weight is blended with sufficient terpolymer solution of Example I to provide 100 parts by weight of the terpolymer on a dry solids basis. After thorough mixing, the oil-terpolymer solution is introduced into a vessel filled with hot water to which steam is supplied. The solvent is removed overhead, and the oil extended terpolymer is precipitated in the form of crumb. The oil extended terpolymer has a Mooney plasticity of about 65 $ML_8$ at 250° F.

The crumb is dewatered, dried, compounded, cured and tested in accordance with Example II. Comparable results are obtained.

EXAMPLE VII

The procedure of Example VIII is followed with the exception of adding 130 parts by weight of extender oil and 120 parts by weight of carbon black for each 100 parts by weight of terpolymer in the solution. The carbon black is added by intimately contacting the solution of terpolymer with a suspension of finely ground carbon black in water or the polymerization solvent. The solution of oil and terpolymer contains suspended carbon black, and the resulting oil-carbon black masterbatch is recovered in the form of crumb following the procedure of Example VI. The Mooney plasticity value is about 50 $ML_4$ at 212° F. The masterbatch is mixed with curatives in conventional mixing equipment or on a mill to give a curable compound equivalent in handling and extrusion characteristics to the compounded stock produced in Example II. Comparable results are obtained upon curing and testing the oil-carbon black masterbatch in accordance with Example II.

I claim:

1. A method of preparing an oil extended sulfur vulcanizable synthetic elastomeric material without corresponding reduction in tensile and modulus comprising admixing an extender oil with a synthetic elastomeric material in the form of an interpolymer prepared by interpolymerizing a monomeric mixture of ethylene, at least one monoethylenically unsaturated hydrocarbon having from 3–16 carbon atoms, and a 5-ethylidene-2-norbornene present in an amount to provide an initial unsaturation level of 5–25 C=C groups per 1000 carbon atoms in the unextended sulfur vulcanizable synthetic elastomer and in which the unextended elastomeric material is also reacted to a high Mooney value of at least 80 at $ML_8$ — 250°F, the extender oil being added in an amount within the range of 25–400 phr and is so adjusted to the original Mooney of at least 80 that the Mooney of the oil extended elastomeric material ranges between 40 and about 80.

2. The oil extended sulfur vulcanizable elastomeric EPDM in which an extender oil is admixed with an EPDM prepared by interpolymerizing a monomeric mixture of ethylene, at least one monoethylenically unsaturated hydrocarbon having from 3–16 carbon atoms and 5-ethylidene-2-norbornene present in an amount to provide an initial unsaturation level of 5–25 C=C groups per 1,000 carbon atoms in the unextended sulfur vulcanizable EPDM and in which the unextended EPDM is also reacted to a high Mooney value of at least 80 $ML_8$ — 250°F, the extender oil being added in an amount within the range of 25–400 phr and is so adjusted to the original Mooney of at least 80 that the Mooney of the oil extended elastomeric material ranges between 40 and about 80.

3. The method of claim 1 wherein about 25–400 parts by weight of the extender oil are added for each 100 parts by weight of the elastomeric material.

4. The method of claim 1 wherein the unextended elastomeric material has a Mooney plasticity of about 80–250 $ML_8$ at 250° F.

* * * * *